United States Patent [19]

Han

[11] Patent Number: 5,715,352
[45] Date of Patent: Feb. 3, 1998

[54] LINKAGE SYSTEM BETWEEN VIDEO CASSETTE RECORDER SET AND TELEVISION SET AND CONTROLLING METHOD THEREFOR

[75] Inventor: Seok Jin Han, Kyungki-do, Rep. of Korea

[73] Assignee: LG Electronics Inc., Seoul, Rep. of Korea

[21] Appl. No.: 542,359

[22] Filed: Oct. 12, 1995

[51] Int. Cl.$^6$ .................................................. H04N 5/76
[52] U.S. Cl. ............................ 386/46; 386/95; 348/468
[58] Field of Search .......................... 386/46, 95, 83; 348/563, 565, 468; H04N 5/76

[56] References Cited

U.S. PATENT DOCUMENTS

| | | | |
|---|---|---|---|
| 5,097,348 | 3/1992 | Suetaka | 386/95 |
| 5,473,481 | 12/1995 | Min | 348/468 |
| 5,526,127 | 6/1996 | Yonetani et al. | 386/83 |
| 5,552,833 | 9/1996 | Henmi et al. | 386/83 |

*Primary Examiner*—Thai Tran
*Assistant Examiner*—Huy Nguyen
*Attorney, Agent, or Firm*—John P. White

[57] ABSTRACT

A linkage operation between a TV set and a VCR set is allowed by inputting and/or outputting caption data from/to TV set and VCR set, TV set including a TV state detector for detecting the current TV state, a TV microprocessor for controlling the corresponding function in the VCR set according to a detection signal from the TV state detector and a caption signal input/output through the transmission lines, a TV caption signal processor for decoding or encoding the caption signal by the control of the TV microprocessor, and a TV video signal processor for data-converting the caption signal reproduced onto a TV caption encoder of the TV caption signal processor and transmitting the converted signal to a VCR caption decoder of the VCR set, and the VCR set including a VCR state detector for detecting the current VCR state, a VCR microprocessor for controlling the corresponding function in the TV set according to a detection signal from the VCR state detector and a caption signal input/output through the transmission lines, a VCR caption signal processor for decoding or encoding the caption signal by the control of the VCR microprocessor, and a VCR video signal processor for data-converting the caption signal reproduced onto a TV caption encoder of the VCR caption signal processor and transmitting the converted signal to a TV caption decoder of the TV set.

1 Claim, 5 Drawing Sheets

F I G.1A
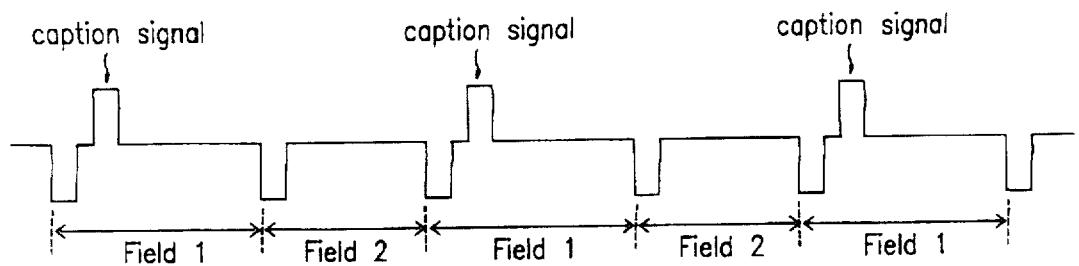
F I G.1B
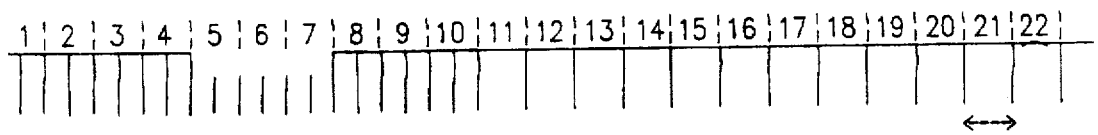
F I G.1C
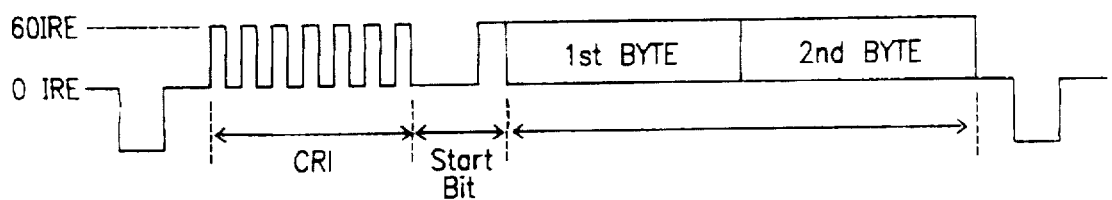

LINKAGE SYSTEM BETWEEN VIDEO CASSETTE RECORDER SET AND TELEVISION SET AND CONTROLLING METHOD THEREFOR

BACKGROUND OF THE INVENTION

The present invention relates to a linkage system between a video cassette recorder (VCR) set and a television (TV) set, and more particularly, to a linkage system between a VCR set and a TV set which allows mutual linkage between TV set and VCR set through video signal transmission lines by installing each caption signal processor within the respective sets without using separate linkage controlling lines during mutual linkage operation, and the controlling method therefor.

In general, a caption method adopted for a VCR processes the contents to be watched with captions on a screen of television, so that an auditory handicapped can watch television properly.

Such a caption function is performed in a broadcasting station or a video program production center such that audio information is decoded and is output to a television screen with caption through a caption decoder of a television receiver by making the audio information among video signals into data and transmitting the data to the invisible section of the television screen, i.e., vertical blanking interval section, together with video signal.

FIG. 1A is a diagram showing the relationship between the position and waveform of caption signals among general video signals. The scanning of a video signal is performed using an interlace method by which 262.5 scanning lines are alternately scanned on a screen to constitute a video screen. The thus-constituted screen by 262.6 scanning lines is called a field, and an odd field and an even field alternate to be a video screen of one frame.

Composite video signals to which a caption signal is inserted within one frame is as shown in FIG. 1A. The caption signal among the video signals is inserted into a caption line of a line 21 of the odd field, as shown in FIG. 1B. As shown in FIG. 1C, as to the caption line, a start bit is displayed after 7 clock-run-in pulses, and the 2-byte data is loaded. The data is an ASCII code in English. Since a character requires one byte, two character information is loaded for one caption waveform. Therefore, two English characters can be loaded in the video frame of a screen. 30 kinds of screens can be displayed for one second. Thus, the maximum 60 characters can be displayed on a screen for one second.

FIG. 2 is a block diagram of a conventional linkage system between a VCR and a TV set. The linkage system is constituted by a VCR set 1, a TV set 2 connected to VCR set 1, an audio line 3 for mutually connecting TV set 2 and VCR set 1, a video line 4 and a linkage control line 5.

In such a linkage system, a video tape is loaded to VCR set 1 and then a play function key is pressed so that TV set 2 recognizes the play state of VCR set 1 through linkage control line 5. An audio signal, a video signal and a linkage control signal output from VCR set 1 through a signal transmission line such as audio line 3, video line 4 and linkage control line 5 are processed during a signal processing course within TV set 2. The state of TV set 2 is converted into that setting VCR set 1 according to the linkage control signal for informing the play state of VCR set 1.

However, the aforementioned conventional linkage system between VCR set and TV set requires a separate linkage control line 5, which complicates mutual connection between the respective sets.

Also, linkage control line 5 executes the linkage operation only by a unidirectional control from VCR set 1 to TV set 2 except audio line 3 and video line 4, which causes inconvenience in use for both sets and makes a user confused.

SUMMARY OF THE INVENTION

To solve the problems of the prior art, it is, therefore, an object of the present invention to provide a linkage system between a VCR set and a TV set, which enables bidirectional control between TV set and VCR set through first and second video signal transmission lines during linkage operation, by installing each caption signal processor within the respective sets for their mutual linkage.

It is another object of the present invention to provide a controlling method of a linkage system between a VCR set and a TV set, which allows an operational control by the playback and recording of TV set or VCR set, by detecting mutual caption data from first and second video signal transmission lines and decoding or encoding the same.

To accomplish the first object of the present invention, there is provided a linkage system between a VCR set and a TV set, which are connected to signal transmission lines, for recording or reproducing a video signal and an audio signal, wherein the TV set comprises: a TV state detector for detecting the current TV state; a TV microprocessor for controlling the corresponding function in the VCR set according to a detection signal from the TV state detector and a caption signal input/output through the transmission lines; a TV caption signal processor for decoding or encoding the caption signal by the control of the TV microprocessor; and a TV video signal processor for data-converting the caption signal reproduced onto a TV caption encoder of the TV caption signal processor and transmitting the converted signal to a VCR caption decoder of the VCR set; and the VCR set comprises: a VCR state detector for detecting the current VCR state; a VCR microprocessor for controlling the corresponding function in the TV set according to a detection signal from the VCR state detector and a caption signal input/output through the transmission lines; a VCR caption signal processor for decoding or encoding the caption signal by the control of the VCR microprocessor; and a VCR video signal processor for data-converting the caption signal reproduced onto a TV caption encoder of the VCR caption signal processor and transmitting the converted signal to a TV caption decoder of the TV set.

To accomplish the second object of the present invention, there is provided a controlling method of a linkage system between a VCR set and a TV set, comprising the steps of: detecting and decoding a caption signal data from a video signal when the video signal is applied from a second video signal transmission line; successively determining the presence or absence of VCR recording instruction data in the VCR set after the decoding step, and the VCR power-on or power-off state; terminating all operations if it is determined that there is no VCR recording command data in the determining step, and outputting a VCR power-on command to the control signal line of the VCR if the VCR power is not turned on; and outputting a VCR recording command to the control signal line of the VCR, recording caption data and then terminating the operations.

Also, there is provided another controlling method of a linkage system between a VCR set and a TV set, comprising the steps of: detecting and decoding a caption signal data from a video signal when the video signal is applied from a first video signal transmission line; successively determining the presence or absence of TV recording instruction data in the TV set after the decoding step, and the TV power-on or power-off state; terminating all operations if it is determined that there is no TV recording command data in the determining step, and outputting a TV power-on command to the control signal line of the TV if the TV power is not turned on; and outputting a TV recording command to the control signal line of the TV, recording caption data and then terminating the operations.

BRIEF DESCRIPTION OF THE DRAWINGS

The above objects and advantages of the present invention will become more apparent by describing in detail a preferred embodiment thereof with reference to the attached drawings in which:

FIG. 1A is a diagram showing the relationship between the position and waveform of caption signals among general video signals;

FIG. 1B is a partially enlarged diagram of the caption signal section shown in FIG. 1A;

FIG. 1C is a partially enlarged diagram of caption lines shown in FIG. 1B;

DETAILED DESCRIPTION OF THE INVENTION

Figure 2:
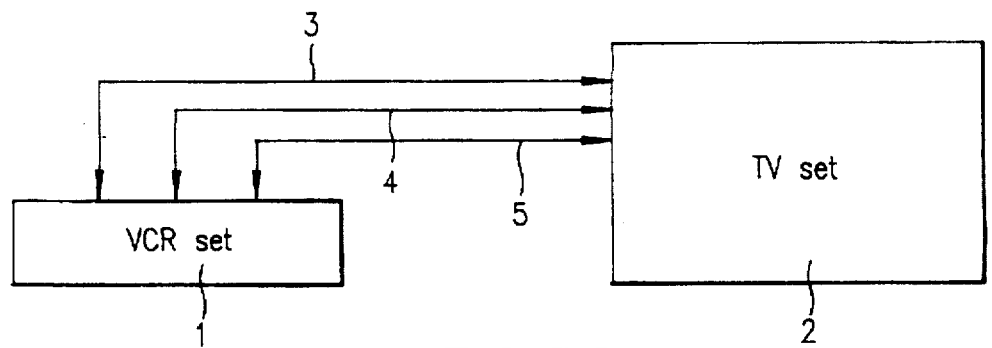
FIG. 2 is a block diagram of a conventional linkage system between a VCR set and a TV set.
Figure 3:
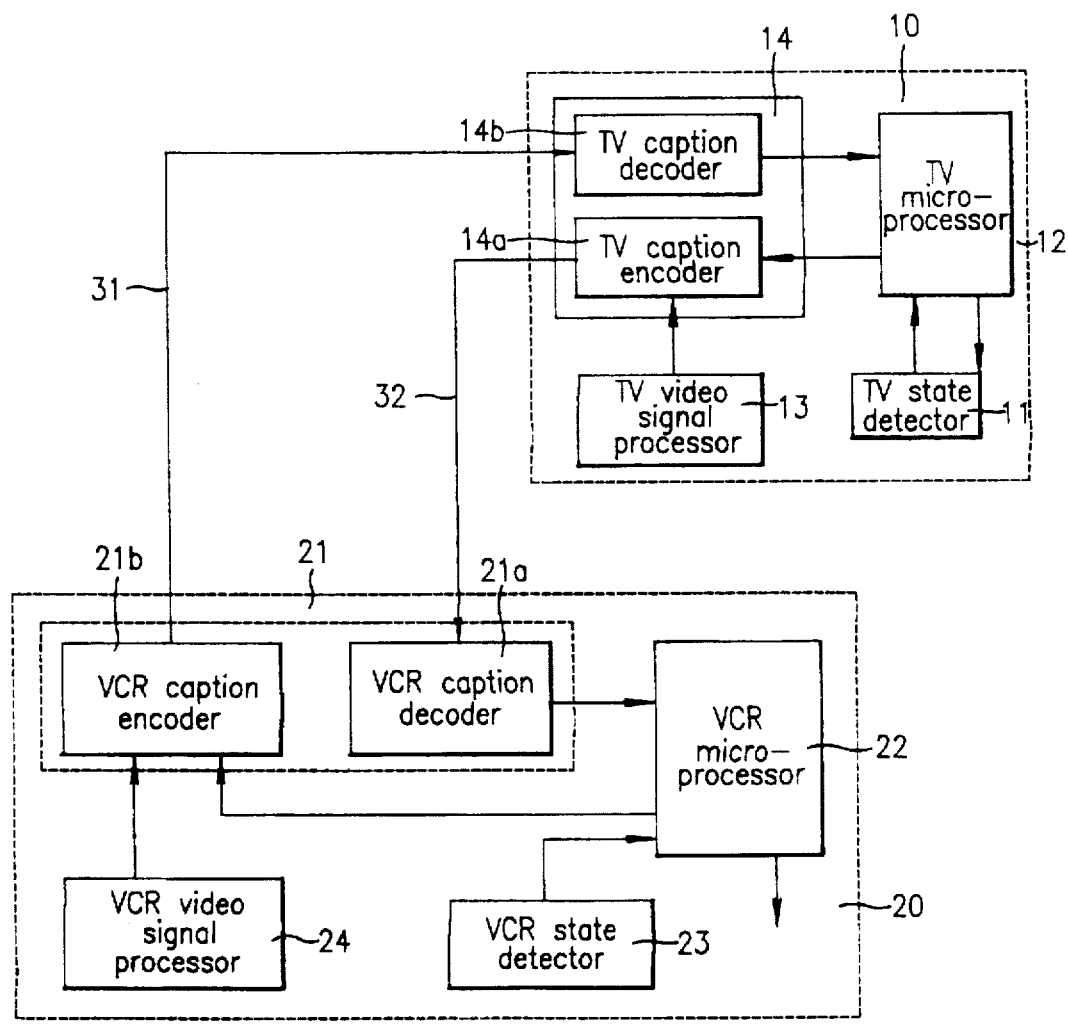
FIG. 3 is a block diagram of a linkage system between a VCR set and a TV set according to the present invention.

In FIG. 3, a TV set 10 includes a TV state detector 11 for detecting the current TV state, a TV microprocessor 12 for controlling the corresponding function of a VCR set 20 according to a detection signal of TV state detector 11 and a caption signal input through a second video signal transmission line 32, a TV caption signal processor 14 for decoding or encoding the caption signal according to the control of TV microprocessor 12 and a TV video signal processor 13 for data-converting the caption signal reproduced onto a TV caption encoder 14a of VCR caption signal processor 14 and transmitting the converted signal to a VCR caption decoder 21 of VCR set 20.

Here, TV caption signal processor 14 is constituted by a TV caption decoder 14b connected to a first video signal transmission line 31 and a TV caption decoder 14a connected to a second video signal transmission line 32.

Also, VCR set 20 includes a VCR state detector 23 for detecting the current VCR state, a VCR microprocessor 22 for controlling the corresponding function of TV set 10 according to a detection signal of VCR state detector 23 and a caption signal input through a first video signal transmission line 31, a VCR caption signal processor 21 for decoding or encoding the caption signal according to the control of VCR microprocessor 22 and a VCR video signal processor 13 for data-converting the caption signal reproduced onto a VCR caption encoder 21b of VCR caption signal processor 21 and transmitting the converted signal to a TV caption decoder 14b of TV set 10.

Here, VCR caption signal processor 21 is constituted by VCR caption decoder 21a connected to first video signal transmission line 31 and VCR caption decoder 21b connected to second video signal transmission line 32.

Referring to FIG. 3, in the linkage system between VCR set and TV set according to the present invention having the aforementioned configuration, a user's selection of a reproduction mode of VCR set 20 is detected in VCR state detector 23 and a detection signal is applied to VCR microprocessor 22.

VCR microprocessor 22 transmits a reproduction mode state code to VCR caption encoder 21b. VCR caption encoder 21b data-converts the reproduction mode state code into caption data and loads the caption data onto a video signal received from VCR video signal processor 24 to be output to first video signal transmission line 31 through a video output port (not shown).

Also, TV caption decoder 14b of TV set 10 extracts a caption signal from the video signal transmitted to first video signal transmission line 31 and transmits the decoded state code of VCR Set 20 to TV microprocessor 12.

Also, TV microprocessor 12 determines the power state of TV set 10 and the reproduction feasibility of VCR set 20 by the state code of VCR set 20, transmitted from TV caption decoder 14b, turns TV set 10 on, and converts the mode of TV set 10 into a reproduction mode, so that the video signal onto which the VCR caption signal can be reproduced.

A user's selection of a recording mode of TV set 10 is detected in TV state detector 11 and a detection signal is applied to TV microprocessor 12.

TV microprocessor 12 transmits a recording mode state code to TV caption encoder 14a. TV caption encoder 14a data-converts the recording mode state code into caption data and loads the caption data onto a video signal received from TV video signal processor 13 to be output to second video signal transmission line 32 through video output port (not shown).

Also, VCR caption decoder 21a of VCR set 20 extracts a caption signal from the video signal transmitted to second video signal transmission line 32 and transmits the decoded state code of TV set 10 to VCR microprocessor 22.

Also, VCR microprocessor 22 determines the power state of VCR set 20 and the reproduction feasibility of TV set 10 by the state code of TV set 10, transmitted from VCR caption decoder 21a, turns VCR set 20 on, and converts the mode of VCR set 20 into a recording mode, so that the video signal onto which the VCR caption signal can be recorded.

Figure 4:
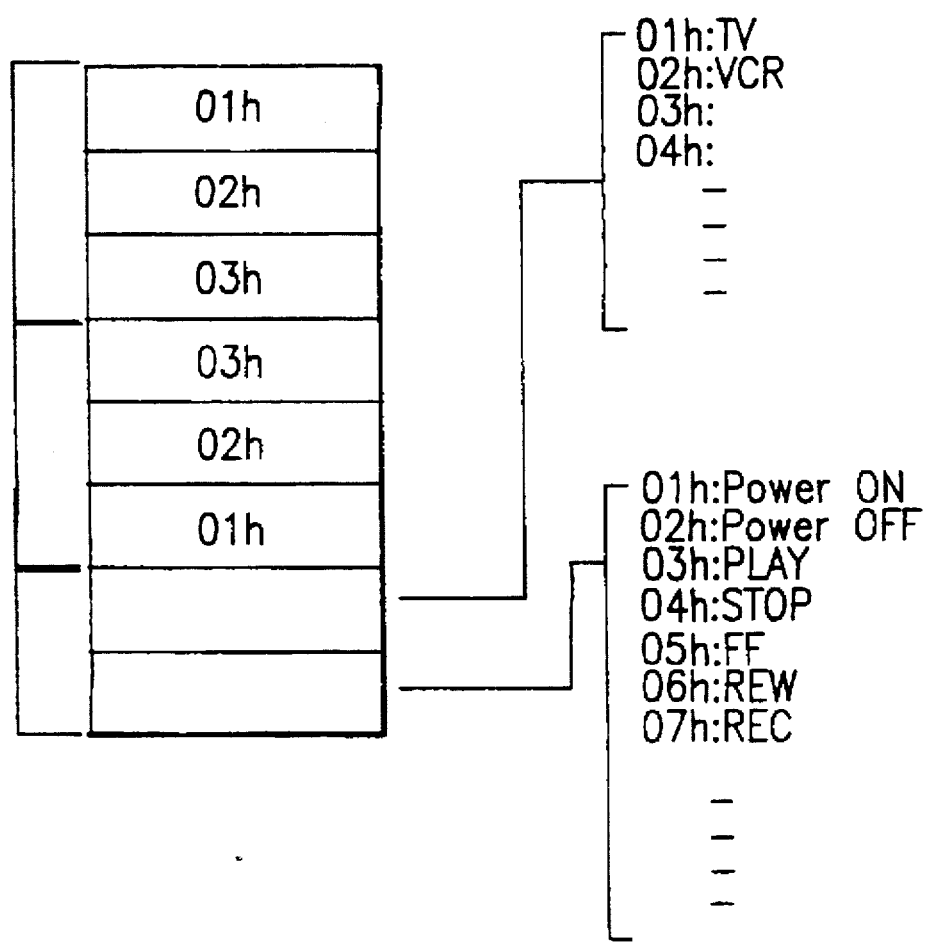
FIG. 4 shows header values and code values of caption data adopted in the present invention.

The control commands exchanged between TV set 10 and VCR set 20 are comprised of header values and code values of caption data shown in FIG. 4. 01h, 02h and 03h are used as the header values of the control commands and the control commands are transmitted following after the header values.

In the structure of caption data comprised of the header values and code values, after 3-byte header values are transmitted and then 3-byte header values of the reverse sequence are transmitted, the control commands depending on the instrument number and operative state are transmitted.

Only if 3-byte header values and the 3-byte header values of the reverse sequence are identical, TV caption decoder 14b and VCR caption decoder 21b receiving the control commands recognize the data coming thereafter as the control commands and controls TV set 10 and VCR set 20.

The control commands exchanged between TV set 10 and VCR set 20 are divided into the instrument numbers and the operative states. At this time, as to the instrument numbers, 128 instruments can be indicated with one byte at the maximum (e.g., 01h: TV, 02h: VCR, ... ). Also, as to the operative states, 128 states can be indicated with one byte at the maximum (e.g., 01h: power-on, 02h: power-off, 03h: play, 04h: stop, 05h: wind, 06h: rewind, 07h: record, ... ). Here, among the instrument numbers, it is promised that 01h represents a TV, 02h represents a VCR, 03h represents a camcorder, etc. and the operative states are also promised as indicated in FIG. 4.

Therefore, in view of the transmission of the control commands, while an instrument notifies another instrument of its own state, its instrument number and operative state are encoded within a caption encoder to be transmitted. Also, in order to control another instrument, the number of the instrument to be controlled and the operative state thereof are encoded to be transmitted.

On the contrary, in view of the reception of the control commands, if the number of the instrument depending on the control command decoded by a caption decoder is identical with its own number, the operation corresponding to the operative state data transmitted thereafter is executed. Also, if the number of the instrument depending on the control command decoded by a caption decoder is not identical with its own number, the type of the instrument connected to the instant instrument and the operative state thereof are determined to execute the proper operation for itself.

Figure 5:
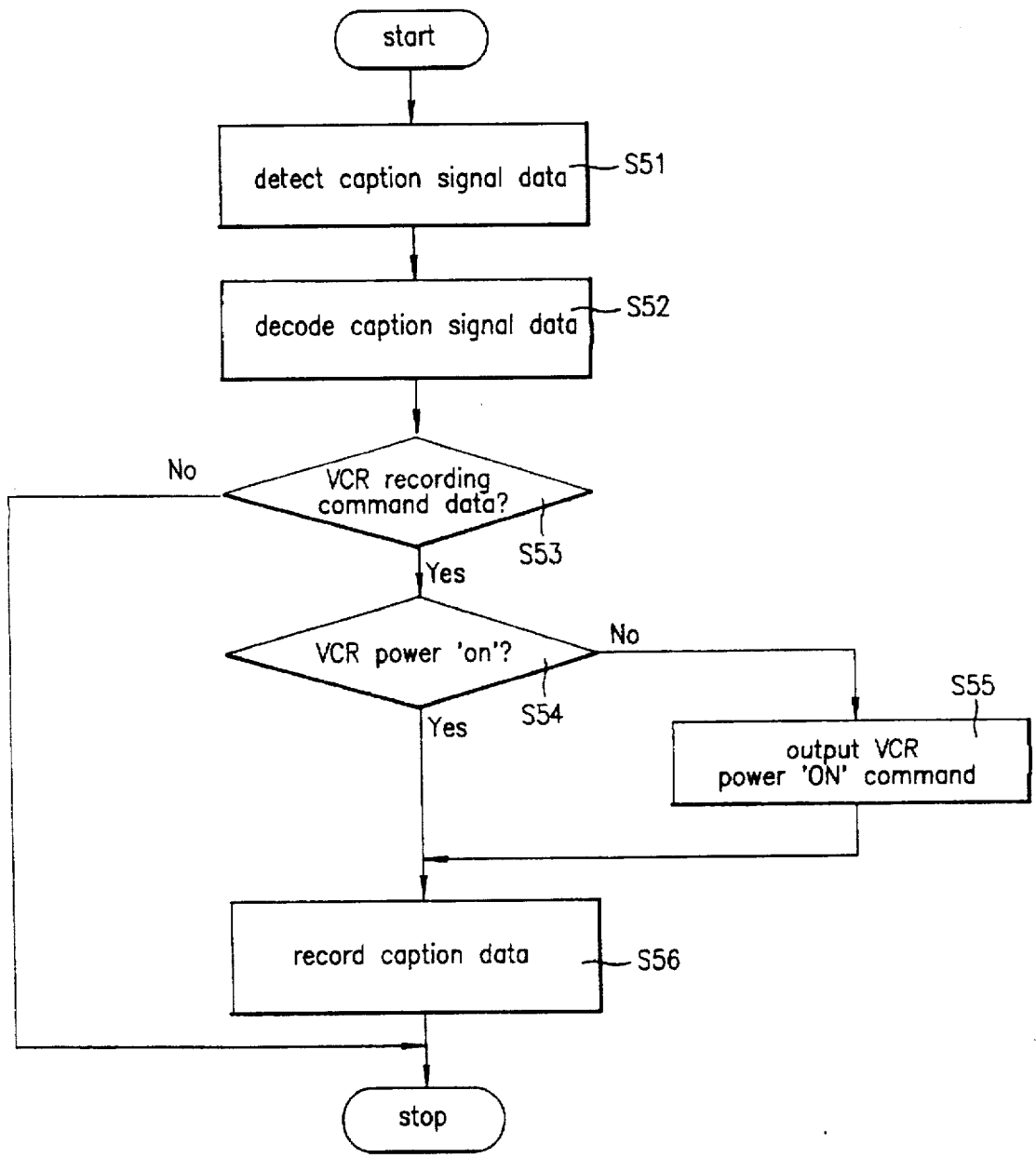
FIG. 5 is a flowchart showing the controlling method during linkage operation by the VCR set according to the present invention.
Figure 6:
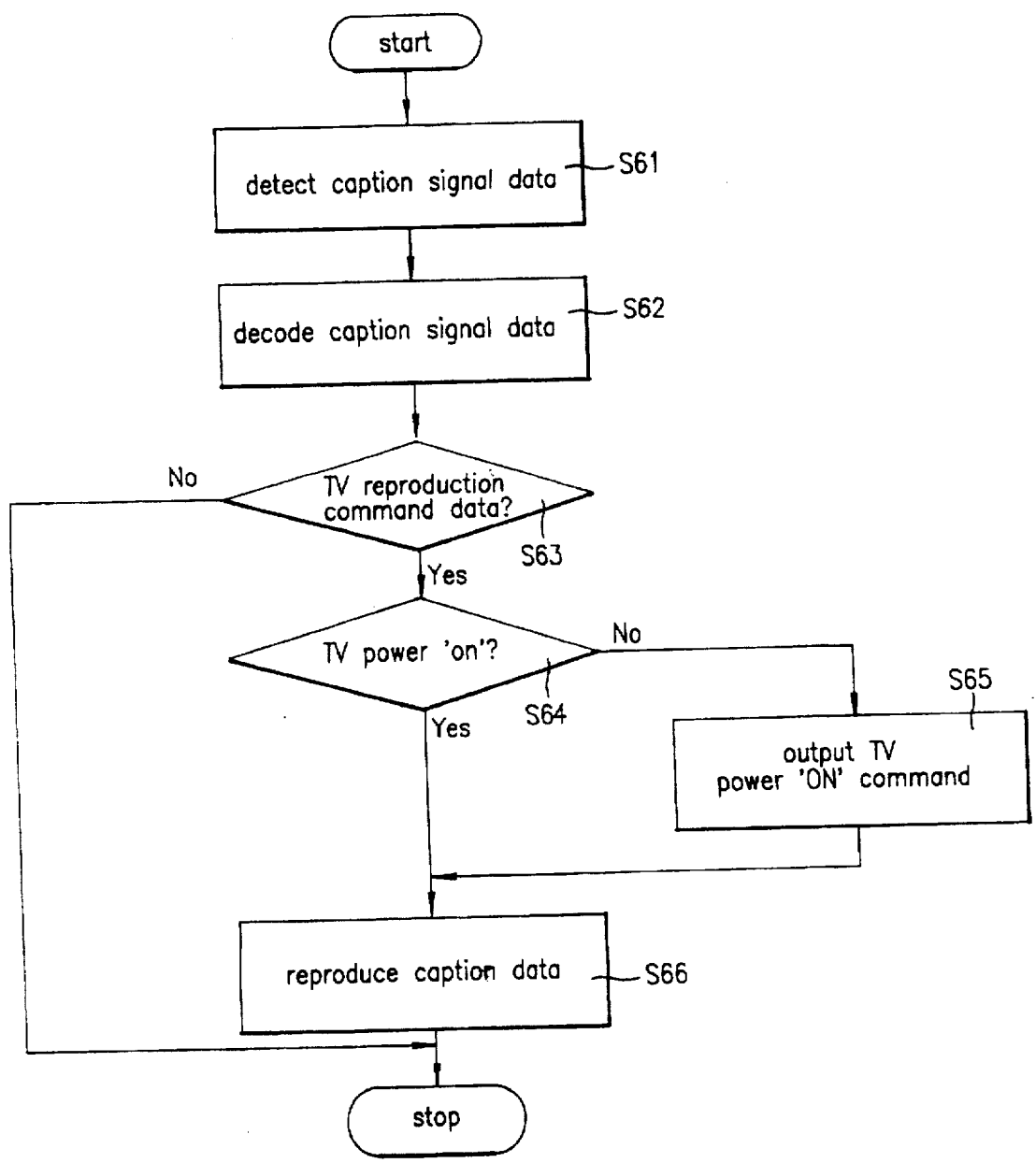
FIG. 6 is a flowchart showing the controlling method during linkage operation by the TV set according to the present invention.

FIG. 5 is a flowchart showing the control method during linkage operation of VCR set according to the present invention, and FIG. 6 is a flowchart showing the control method during linkage operation of TV set according to the present invention.

First, the linkage operation of VCR set 20 will be described, referring to FIG. 5. If a video signal is input from second video signal transmission line 32, caption signal data is detected from the video signal and is decoded through VCR caption decoder 21a (steps 51 and 52). In steps 51 and 52, TV caption encoder 14a of TV set 10 encodes headers from the video signal in a sequence of 01h, 02h>, 03h, 03h>, 02h and 01h. Subsequently, the control commands of 02h and 01h, which represent a power-on state of VCR, and 02h and 07h, which represent a recording state of VCR) are encoded to transmit to VCR set 20 through second video signal transmission line 32. Here, a caption signal is transmitted to TV set 10 by encoding caption data while carrying a live coverage in a broadcasting station. When a tape is produced using VCR set 20 not by being broadcast live, the caption signal can be inserted into a composite video signal using caption encoder.

Thereafter, VCR set 20 receives the control commands and extracts caption data. Subsequently, VCR recording command data is determined from the caption data by three steps to be described later. First, it is determined whether first and second bytes of the caption data are 01h and 02h. Second, it is determined whether first and second bytes of the caption data are 03h and 03h. Third, it is determined whether first and second bytes of the caption data are 02h and 01h. Therefore, if the first and second bytes of the caption data are the same with 02h and 01h, VCR set 20 is automatically turned on.

At this time, if VCR recording command data is not determined from the caption data in step 53, all operations are terminated. If it is determined in step 54 that VCR is not turned on, a VCR power-on command is output to a control signal line of VCR in a control command outputting step (step 55), thereby turning VCR 20 on.

Subsequently, after steps 53, 54 and 55, a VCR recording command is output to control signal line of VCR for recording caption data and then the operation is terminated (step 56). This procedure is performed by three determining steps to be described later. First, it is determined whether first and second bytes of the caption data are 01h and 02h. Second, it is determined whether first and second bytes of the caption data are 03h and 03h. Third, it is determined whether first and second bytes of the caption data are 02h and 07h. Therefore, if the first and second byte's of the caption data are the same with 02h and 07h, VCR set 20 performs recording operation.

Next, the linkage operation of TV set will be described with reference to FIG. 6. If a video signal is input from first video signal transmission line 31, caption signal data is detected from the video signal and is decoded through TV caption decoder 14b (steps 61 and 62). In steps 61 and 62, VCR caption encoder 21a of VCR set 20 encodes headers from the video signal in a sequence of 01h, 02h>, 03h, 03h>, 02h and 01h. Subsequently, the control commands of 02h, which represents the instrument number of VCR, and 03h, which represents the operative state code of VCR are encoded to transmit to TV set 10 through first video signal transmission line 31.

After steps 61 and 62, TV set 10 receives the control command to then extract caption data, which is allowed by TV caption decoder 14b sequentially extracting caption data from a line 21 of a field 1. The caption of the maximum 60 characters per second is displayed on a TV screen.

Subsequently, the command data depending on the video mode of TV set is determined from the caption data by three steps to be described later. First, it is determined whether first and second bytes of the caption data are 01h and 02h. Second, it is determined whether first and second bytes of the caption data are 03h and 03h. Third, it is determined whether first and second bytes of the caption data are 02h and 01h. Therefore, if the first and second bytes of the caption data are the same with 02h and 03h, TV set 10 is converted into a video mode and is turned on.

At this time, if TV reproduction command data is not determined from the caption data in step 63, all operations are terminated. If it is determined in step 64 that TV is not turned on, a TV power-on command is output to a control signal line of TV in a control command outputting step (step 65), thereby turning TV 10 on. Therefore, the caption data is displayed to TV set 10, thereby enabling to view the caption on TV screen.

As described above, the linkage operation according to the present invention is allowed by comprising TV set and VCR set and by inputting and/or outputting caption data from/to TV set and VCR set. TV set including a TV state detector for detecting the current TV state, a TV microprocessor for controlling the corresponding function in VCR set according to a detection signal from TV state detector and a caption signal input/output through the transmission lines, a TV caption signal processor for decoding or encoding the caption signal by the control of TV microprocessor, and a TV video signal processor for data-converting the caption signal reproduced onto a TV caption encoder of TV caption signal processor and transmitting the converted signal to a VCR caption decoder of VCR set, and VCR set including a VCR state detector for detecting the current VCR state, a VCR microprocessor for controlling the corresponding function in TV set according to a detection signal from VCR state detector and a caption signal input/output through the transmission lines, a VCR caption signal processor for decoding or encoding the caption signal by the control of VCR microprocessor, and a VCR video signal processor for data-converting the caption signal reproduced onto a TV caption encoder of VCR caption signal processor and transmitting the converted signal to a TV caption decoder of TV set.

Therefore, such a system can execute the caption function by a bidirectional control from VCR set to TV set or vice versa, which solves the problem of the conventional unidirectional control. Also, this system can be utilized for a VCR set and a TV having caption function.

In such a manner, the linkage system between a VCR set and a TV set and the controlling method thereof according to the present invention allows the linkage operation for a camcorder as well, by arbitrarily setting control commands depending on instrument numbers and operative states. Therefore, the present invention is not limited to this embodiment and various changes and modifications may be effected without departing from the scope of the invention.

What is claimed is:

1. A linkage system between a VCR set and a TV set, which are connected to signal transmission lines, for recording or reproducing a video signal and an audio signal, wherein said TV set comprises:

a TV state detector for detecting the current TV state;

a TV microprocessor for controlling the corresponding function in said VCR set according to a detection signal from said TV state detector and a caption signal input/output through the transmission lines;

a TV caption signal processor for decoding or encoding the caption signal by the control of said TV microprocessor; and a TV video signal processor for data-converting the caption signal reproduced onto a TV caption encoder of said TV caption signal processor and transmitting the converted signal to a VCR caption decoder of said VCR set; and said VCR set comprises:

a VCR state detector for detecting the current VCR state;

a VCR microprocessor for controlling the corresponding function in said TV set according to a detection signal from said VCR state detector and a caption signal input/output through the transmission lines;

a VCR caption signal processor for decoding or encoding the caption signal by the control of said VCR microprocessor; and a VCR video signal processor for data-converting the caption signal reproduced onto a TV caption encoder of said VCR caption signal processor and transmitting the converted signal to a TV caption decoder of said TV set.

* * * * *